United States Patent [19]

Forestier et al.

[11] 4,449,607

[45] May 22, 1984

[54] SOUNDPROOFING FOR A GAS PIPE, IN PARTICULAR FOR THE FAN JET OF A TURBOJET, AND EQUIPMENT FOR ITS FABRICATION

[75] Inventors: Alexandre Forestier, Vaux le Penil; Alain A. Pluquet, Melun; Roger A. Rosa, Morangis; Mansour Tabet, Melun; Pierre M. Teysseyre, Juvisy sur Orge, all of France

[73] Assignee: S.N.E.C.M.A., Paris, France

[21] Appl. No.: 342,733

[22] Filed: Jan. 26, 1982

[30] Foreign Application Priority Data

Jan. 29, 1981 [FR] France ................. 81 01670

[51] Int. Cl.³ .............................. E04B 1/82
[52] U.S. Cl. ................... 181/213; 181/286; 181/292; 181/294; 428/116
[58] Field of Search ........... 181/213, 214, 222, 224, 181/286, 288, 290, 292, 293, 294, 208; 428/116-118

[56] References Cited

U.S. PATENT DOCUMENTS

| | | | |
|---|---|---|---|
| 2,830,780 | 4/1958 | Schloss | 181/208 X |
| 3,211,253 | 10/1965 | Gonzalez | 181/292 |
| 4,170,674 | 10/1979 | Matsuki | 181/292 X |
| 4,235,303 | 11/1980 | Dhoore et al. | 181/222 X |
| 4,237,176 | 12/1980 | Brueggemann et al. | 181/294 X |

FOREIGN PATENT DOCUMENTS

| | | |
|---|---|---|
| 1086033 | 7/1960 | Fed. Rep. of Germany . |
| 2201010 | 2/1973 | France . |
| 2396868 | 1/1980 | France . |
| 1166843 | 10/1969 | United Kingdom . |
| 2019983 | 11/1979 | United Kingdom . |
| 2019937 | 11/1979 | United Kingdom . |

Primary Examiner—Benjamin R. Fuller
Attorney, Agent, or Firm—Oblon, Fisher, Spivak, McClelland & Maier

[57] ABSTRACT

Soundproof lining for a gas pipe, in particular for a turbojet fan jet, of the type including a multiplicity of thin, perforated panels juxtaposed by tiling, as well as an intermediate layer between the wall of the pipe and each of said panels to delimit with said perforated panel a multiplicity of resonant acoustical cavities in which the acoustical vents consist of the ports in the perforated panel. According to the invention, in order to make the tubular vents, each perforated panel has a short, tubular sleeve at right angles to each port and located on its face opposite the wall of the pipe.

8 Claims, 5 Drawing Figures

SOUNDPROOFING FOR A GAS PIPE, IN PARTICULAR FOR THE FAN JET OF A TURBOJET, AND EQUIPMENT FOR ITS FABRICATION

BACKGROUND OF THE INVENTION

1. Field of the Invention

The present invention concerns a soundproof lining for a gas pipe. It also concerns tools for fabricating elements of this lining.

The invention's lining, because of its thinness, lightness, good impact resistance and ease of installation, is particularly suitable for soundproofing the upstream and downstream housings of a turbojet fan. Generally speaking, it can be used advantageously whenever it is necessary to reduce the noise level produced in a large-diameter stream by a gas flow with a relatively low temperature.

2. Description of the Prior Art

The lining of the invention is of the type consisting of the juxtaposition of composite soundproofing panels within which are resonant cavities which communicate with the gas flow by a multiplicity of vents. Such composite panels are already known, in particular through the French patent No. 2 201 010. They include two sheets facing one another, one of which, in contact with the gas flow, is perforated. These two sheets are braced by a corrugated sheet, the corrugations of which delimit the resonant cavities. The three sheets are of metal and are rigidly assembled by brazing. Such composite panels must have precise radii of curvature since their rigidity makes it impossible to compensate for size defects by deformation during assembly. This rigidity is even more bothersome when the gas flow stream is large-sectioned. The wall of the stream itself has curve defects. The problem can be solved by interposing a mattress of a flexible and porous material, as has already been proposed in the French patent No. 2 396 868. But this solution is only suitable for relatively small-sectioned streams. Otherwise the lining becomes too cumbersome and heavy.

SUMMARY OF THE INVENTION

The soundproof lining of the invention is free from these drawbacks. Its elements are light and easy to assemble. It is quickly fabricated. It includes both a multiplicity of rigid and thin perforated panels juxtaposed by tiling (that is, one of the edges of one panel covers the edge of an adjacent panel) and, in addition, an intermediate layer shaped so as to delimit, together with said perforated panel, a multiplicity of resonant acoustical cavities in which the acoustical vents consist of the ports in the perforated panel. Each perforated panel is provided with means for direct attachment to the wall forming an interval between it and this perforated panel and the intermediate layer is an intermediate ductile panel housed and held in this interval.

The relative flexibility of the perforated panels (due to their thinness) and the ductility of the intermediate panels make it possible for the lining to be adapted upon assembly to the conformation defects of the jet stream's wall.

But the lining according to the invention has other characteristics and advantages as well. It is known that the resonance frequencies of a cavity depend on its volume and the acoustical resistance of its vent or vents. It is known that the acoustical resistance of a vent can be increased by giving it a tubular shape. The more this acoustical resistance contributes to the cavity's acoustical impedance, the more its resonance frequencies expand and the more the cavity becomes capable of absorbing noise in frequency bands that are appreciably different from its nominal resonance frequencies. To achieve this advantageous effect despite the thinness of the perforated panels of the invention, each of these panels has, at right angles to each of its ports and on its face facing the wall, a short tubular sleeve, the bore of which extends said port to form a tubular vent.

Advantageously, each perforated panel consists of a thin sheet of molded polymer resin reinforced with mineral or organic fibers. Not only is it thus light, relatively rigid and has good elongation characteristics enabling it to take major deformations under impact but, in addition, the tubular sleeves may be molded together with the sheet. Their attachment to this sheet is all the more secure since, according to the invention, the reinforcement fibers penetrate said sleeves.

Other advantageous features of the invention involve the intermediate panel housed between the wall and each perforated panel. In order that such an intermediate panel will be both relatively flexible and capable of forming, with the perforated panel, resonant cavities tight against one another, the invention provides for the following:

1. The intermediate panel consists of a thin sheet of polymer resin (preferably elastomer) held against the wall of the stream by the perforated panel and has ribs the edges of which are held against this perforated panel and which delimit the resonant cavities.

2. In order to prevent the perforated panel from crushing the edges of the ribs (crushing would damage the tightness between the adjacent cavities), these rib edges are flanged. This arrangement becomes particularly advantageous when the lining is in a turbojet fan stream, since the ductility of these flanged edges appreciably increases the mechanical-energy absorption capacity of said lining because unlike the known structures, the intermediate ribbed panel is not closely attached to the perforated panel and can freely follow deformations and resume its initial shape. The perforated panel much better resists repeated hammerings by grit and gravel.

3. In order to facilitate application of the intermediate panel against the wall, this intermediate panel has short ribs on the face opposite said wall.

4. The intermediate panel is mounted with prestress, which consequently achieves a certain damping of the perforated panel against acoustical vibrations.

The tools for making the perforated panels include a fixed mold part and a movable mold part, both to be inserted between the plates of a press, and forming a molding cast. A multiplicity of pins are intended to form the ports of the panel during molding, when the mold is completely closed, each of these pins then passing through one of the mold parts though a pin passage, crossing through the cast and penetrating the other mold part through another pin passage.

Recesses are made at the outlet into the cast of the pin passages of one of the parts of the mold to form molding casts for the tubular sleeves, and pins, made of steel, are covered with a layer of oxide favoring the attachment of an unmolding agent.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
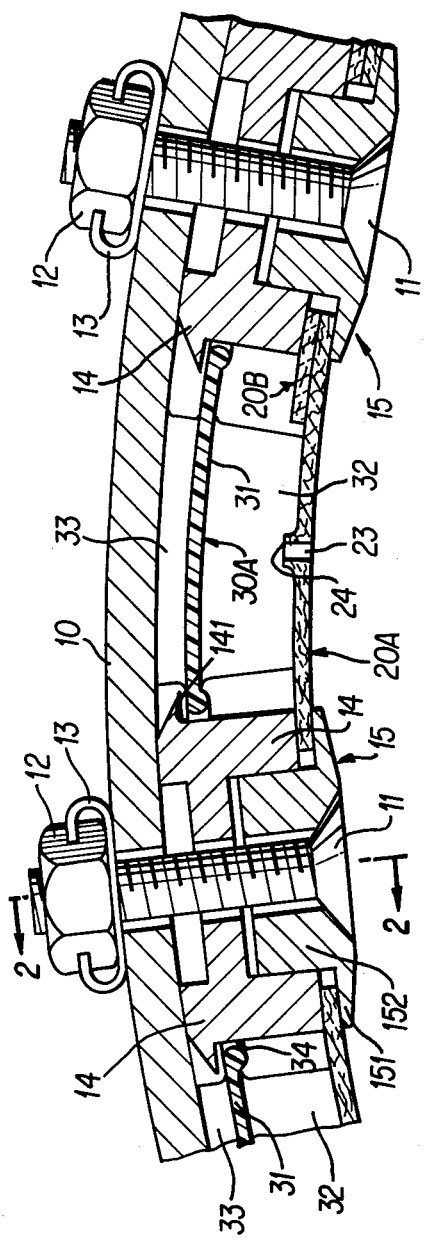
FIG. 1 is a large-scale partial cross section, taken in the plane 1—1 of FIG. 2, of a fan jet equipped with a lining according to the invention.
Figure 2:
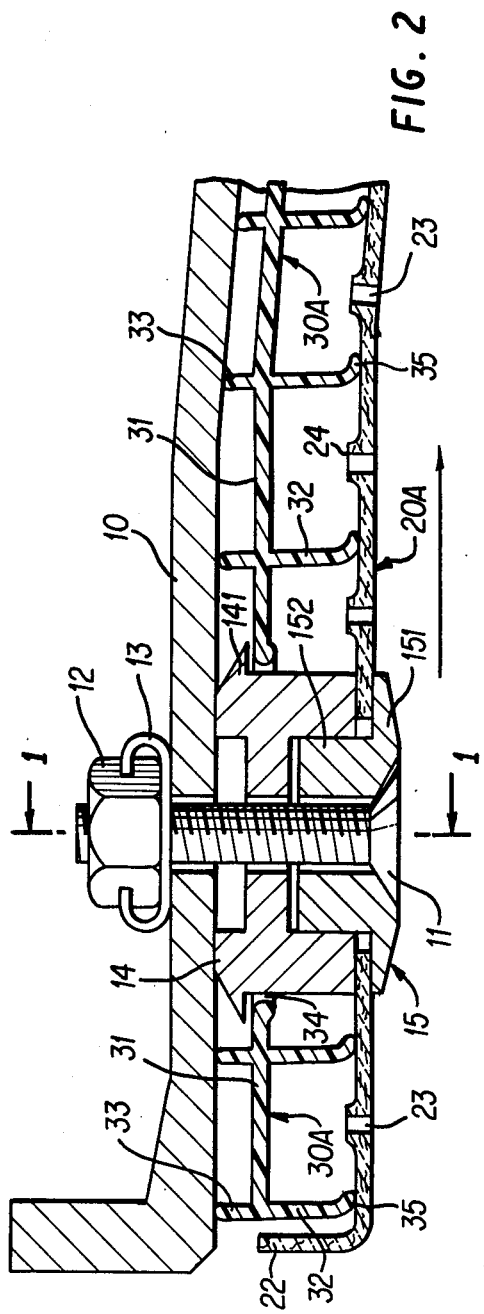
FIG. 2 is a partial cross section on the same scale, taken in the plane 2—2 of FIG. 1, of said fan jet.

The lining of the invention which is intended to soundproof the wall 10 of a fan jet, as seen in FIGS. 1 and 2, and includes both a multiplicity of thin perforated panels 20 (20A, 20B, etc.) attached to the wall 10 at a distance from the wall 10, as well as a multiplicity of ribbed ductile panels 30 (a single ductile panel 30A being shown), each of which is housed and held in the space existing between the wall 10 and a perforated panel 20.

FIG. 1 only shows the perforated panel 20A and the left edge of the adjacent panel 20B. This edge of 20B is engaged upon the right edge of 20A so that a continuous perforated wall is formed by such tiling of the panels 20, thus obtaining panels with overlapping ends.

The parts for attaching each panel 20 to the wall 10 include countersunk head bolts 11 (equipped with nuts 12 and lock washers 13), braces 14 and bolt-head hole washers 15. Each of the latter includes a flange 151 which rests on the panel 20 and a body 152 which is positioned in a centering hole in the associated brace 14. The washers 15 and the braces 14 are preferably glued to the panels 20. The latter is thus held rigidly at a distance from the wall 10.

The bolts 11 placed in a single jet section are in reality spaced farther from one another than is shown in FIG. 1. The two bolts in this Figure are arbitrarily shown closer together to illustrate the case in which a bolt (bolt 11 on the left) assures attachment of an area of a single panel 20 (here 20A) and the case in which a single bolt (bolt 11 on the right) assures simultaneous attachment of the edges of two panels 20 (here, 20A and 20B).

Figure 5:
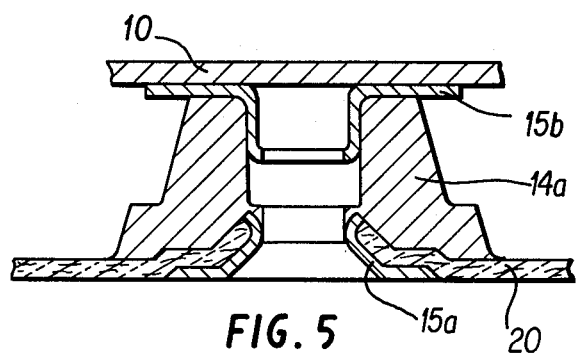
FIG. 5 is a partial cross section analogous to FIG. 1 and showing a variant of FIG. 1.

FIG. 5 shows a variant, according to the invention, of the method for attaching each panel 20 to the wall 10 while keeping each panel rigidly at a distance from the wall. The attachment pieces, in addition to the bolts 11, nuts 12, and stop washers 13 described above and shown in FIGS. 1 and 2, also include braces 14a, first caps 15a forming holes for the bolt heads and second caps 15b. In a preferred embodiment, the braces 14a are molded from a composite material, and their polymerization is performed on the spot at the same time as the polymerization of the panel 20 itself. The caps 15a and 15b are metal, and the first caps 15a are put in place on the panel 20 before polymerization, while the second caps 15b are encased in the braces 14a at the time of assembly.

Like the other ribbed panels 30, the panel 30A housed between the sleeve joint 10 and the perforated panel 20A includes a plate-shaped core 31, a multiplicity of support ribs 32 extending toward the perforated panel 20A, and a multiplicity of support ribs 33 extending toward the sleeve joint 10. Holes such as 34 allow the passage of the braces 14. The latter are equipped with a flange 141 which opposes the movement of the plate 31 towards the wall 10. The ribs 33 are very short, as their sole function is to assure free contact between the wall 10 and the panels 30.

It will be noted that the panel 20A, like the other panels 20 in the same jet section, includes a flanged upstream edge 22 in order to protect the panels 30.

The cores 31, the ribs 32 and the panels 20 thus delimit an annular succession of cavities which may be divided by ribs in the panels 30 which are oriented according to axial planes in the jet stream, and which are not shown. Each of these cavities communicates with the jet stream (arrow in FIG. 2) through a multiplicity of small ports 23 constituting acoustical vents.

The panels 20, which must be both thin and rigid, are made, for example, of an epoxy resin reinforced with fiberglass (stacking of pre-impregnated mats).

The ribbed panels 30, which must not be damaged by the tightening required to assemble them, are made of an elastomer-polymer mixture such as ABS (acrylonitrile-butadiene-styrene).

Other provisions which characterize the lining in FIGS. 1 and 2 are discussed below. The first consists of the presence, at right angles to each perforation 23, of a short sleeve 24 placed on the face of each panel 20 facing the ribbed panel 30 and the wall 10, the port of which is an extension of the perforation 23. The second of these provisions consists of the fact that the edges 35 of the ribs 32 in contact with the corresponding panel 20 are flanged edges. It will be noted that the ribbed panels 30 are held in place solely by the braces 14, without attachment of the panels 30 to the panels 20, nor to the wall 10. It will also be seen in FIGS. 1 and 2 that the sleeves 24 are reinforced by fiber ends of the fiberglass reinforcement. It will later be described how this result is achieved.

Below, by way of example, are some characteristic sizes in millimeters for an acoustical lining of a fan housing with a diameter of about 1700 mm.

1. Thickness of the perforated panels 20 is 1.5 to 1.9;
2. Thickness of the cores 31 of the ribbed panels 30 is 0.7 to 1;
3. Height of the ribs 32 is 6.5 to 7;
4. Length of the vents 23 is 2 to 5, depending on the acoustical frequencies to be absorbed.

It can thus be seen that, given of the nature of the materials used and the values of the thicknesses utilized, the lining according to the invention is extremely light. It is also provided with an excellent mechanical and acoustical damping factor.

Figure 3:
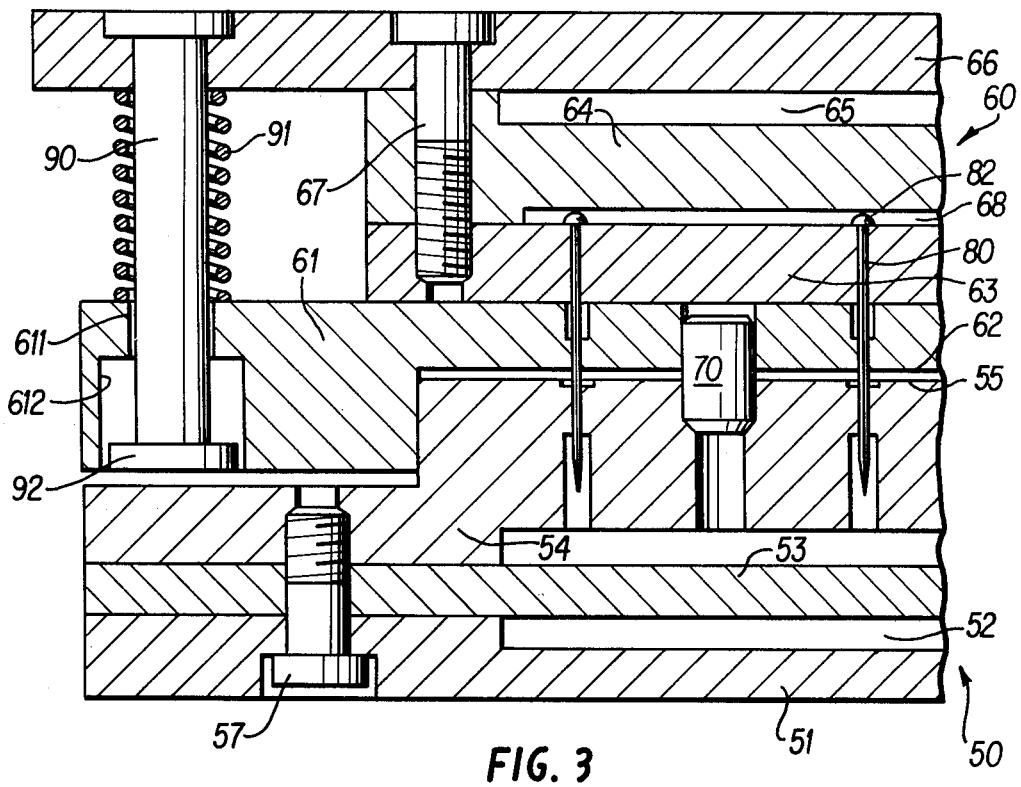
FIG. 3 is a partial section of the mold intended for making the perforated panels of said lining.
Figure 4:
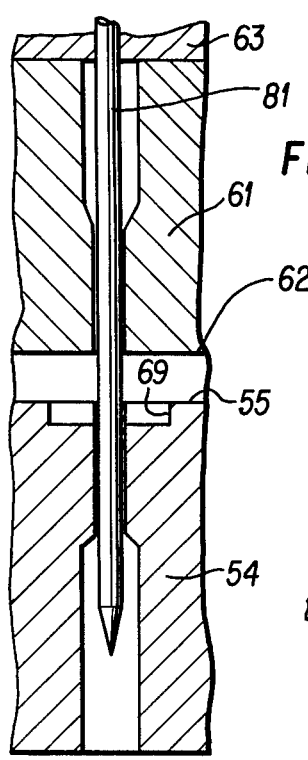
FIG. 4 is an enlarged detail of FIG. 3.

The molding tools according to the invention for making the perforated panels 20 of FIGS. 1 and 2 will now be described with reference to FIGS. 3 and 4. These tools are intended to be placed between the plates of a heated press, not shown. Generally speaking, no mention will be made of the parts or pieces (temperature probes, center punches, gaskets, etc.), whose description would contribute nothing towards understanding the operation of the tools. For delimiting the molding cast, the tools include a fixed mold part 50 and a movable mold part 60.

The fixed part 50 consists of an assembly of a cooling plate and a molding form, the cooling plate including from bottom to top a plate 51 in which there is a laminar water-circulation cavity 52 as well as a foundation plate 53. The molding form (or die) 54 rests on the foundation plate 53 and the upper face 55 delimits the lower wall of the molding cast. These elements are assembled by means of screws 57. The movable part 60 includes from bottom to top a molding counterform (or stamp) 61 delimiting by its face 62 the upper wall of the molding cast, a pin support plate 63, and a cooling plate including a plate 64 in the upper surface of which is a laminar water-circulation cavity 65, as well as a closing counterplate 66.

The plate 63, the plate 64 and the counterplate 66 are assembled by means of screws 67.

The ports for passage of the washer bodies 152 (FIGS. 1 and 2) are made by means of shanks 70 forcibly fitted into bores in the form 54 and which can slide in bores in the counterform 61.

To make the vents 23 (FIGS. 1 and 2), there are tools including a number of pins 80, the shanks 81 of which pass through the support plate 63 and the counterform 61 through bores made for this purpose. These pins are suspended by their heads 82 at the upper face of the plate 63. The heads 82 are housed in a recess 68 in the lower face of the plate 64. The thickness of this recess is just sufficient to house them without pinching them.

The tools also include small columns 90 sunk into the plate 66 and sliding in bores 611 in the counterform 61. Compression springs 91 inserted around these small columns push the plates 63, 64 and 66 away from the counterform 61 when not pressed in by the press. The small columns 90 have feet 92 with a diameter greater than that of their body. These feet slide in recesses 612 in the counterform 61. They limit the upward course of the small columns. This course and the length of the pins 80 are such that the ends of the pins are engaged (when the unit is compressed) in bores of the form 54, and said ends do not leave the cast face of the counterform when the springs 90 retract to the maximum the plates 63, 64 and 66 from the counterform 61.

According to the invention, shallow recesses 69 are made in the lower wall 55 at the mouth of each pin bore; they constitute the molding casts for the sleeves 24 (FIGS. 1 and 2). The bodies 81 of the (steel) pins are pretreated so as to be oxidized on the surface. The oxide layer thus created favors adherence of an unmolding agent thereon, the agent intended to allow extraction of the pins after polymerization of the resin.

The equipment includes in addition four auxiliary jacks (not shown) which are installed between the plates 51 and 66 in order to allow separation of the two parts of the mold after polymerization.

The primary phases of the process for making a perforated panel are as follows. Prior to their use, the pins 80 have undergone a thermal oxidation treatment in an atmosphere of humid argon (500° C. for four hours) intended to form the adherence layer mentioned above.

1. Preparation of the Equipment

After cleaning, the casting faces of the mold and the pins are covered by aerosol spray with a silicone unmolding agent. The unmolding layers are then set by heating for one hour at 150° C.

The open mold is placed on the lower plate of a press. The two cast faces are kept at a steady temperature of approximately 135° C. by, for example, jets of hot air.

2. Preparation and placement of the roughcast

The roughcast includes a stack of precut layers of preimpregnated mat (glass felt with short fibers plus epoxy resin); on either side of the stack, a layer of silicone glass cloth intended to give the panel the desired surface condition; against the face of the roughcast to be placed alongside the upper wall of the cast (pin 80 penetration face), a delaminating cloth separated from the roughcast by a polyamide sealant film; this film is intended to prevent sweating of the resin around the pins during pressing and heating. The roughcast is put in place and centered on the lower part 50 of the mold.

3. Closing the mold and molding

The mold is closed in two steps. When the movable part 60 is applied against the fixed part 50, the springs 91 (by means of the plates 66 and 64) hold the support plate 63 away from the counterform 61. The pins 80 do not yet protrude from the face 62. It is only when the counterform 61 is applied by the press against the form 54 that the springs 91 give way under the pressure of the press and the pins 80 penetrate the form 54, passing through the cast. The fibers are not broken by the penetration of the pins but only pushed aside. They are distributed on either side of the port and expand into the chambers 69 to form reinforcements for the sleeves 24 (FIGS. 1 and 2), assuring continuity for the transmission of stress and guaranteeing good stress resistance in the panel. The heating plates of the press maintain their pressure for 45 minutes, for example, and the temperature of the entire mold is 135° C.

4. Unmolding

A current of water is then admitted into the cavities 52 and 65 to cool the faces of the cast to about 90° C. The upper plate of the press is lifted, and the plate 63 lifts up the pins 80 which are retracted into the counterform 61. Separation of the form 54 and counterform is achieved by means of the auxiliary jacks. The molded panel is removed and, if need be, placed on a conformator to bring it down to room temperature.

5. Finishing

The cooled panel is fettled. The washers 15 and braces 14 (FIGS. 1 and 2) are glued on. Finally, layers of anti-erosion paint are applied.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A soundproof lining for the wall of a gas jet, said lining comprising:
    a plurality of thin panels having overlapping ends and extending parallel to said wall;
    means for fixing said panels directly to said wall and at a distance from said wall whereby said wall and panels define a space therebetween;
    an intermediate ductile panel in said space, said ductile panel and said thin panels together defining a multiplicity of resonant acoustical cavities, wherein said intermediate panel comprises a thin polymer resin sheet having portions contacting said wall, said sheet including first ribs, the distal ends of said first ribs contacting said thin sheet to define said acoustical cavities; and a plurality of acoustical vents for said cavities, said vents comprising perforations in said thin panels.

2. The lining of claim 1 wherein each of said thin panels comprises a thin sheet of molded polymer resin reinforced with mineral or organic fibers, said thin panels including a tubular sleeve surrounding each of said vents and extending from the face of said thin panels which faces said wall, said sleeves being formed integrally with said panels, the reinforcing fibers of said panels extending into said sleeves.

3. The lining of claim 2 wherein said reinforcing fibers comprise stacked layers of fiber felt.

4. The lining of claims 2 or 3 wherein said means for fixing comprise:

braces extending between said thin panels and said wall; and anchoring bolts passing through said braces and fixed to said thin panels and said wall.

5. The lining of claim 4 including first washers fixed to said thin panels and extending from the face of said thin panels opposite said wall to the face of said thin panels facing said wall, said washers defining countersinks, wherein said anchoring bolts comprise countersunk bolts, the heads of which are positionable in said countersinks 6. The lining of claim 5 wherein said thin panels and said braces are polymerized, said polymerization of said thin panels and said braces being performed simultaneously and in situ, said lining including second washers positioned between said braces and said wall.

7. The lining of claim 1 wherein said distal ends of said first ribs include flanges.

8. The lining of claims 1 or 7 wherein said portions of said intermediate panel contacting said wall comprise second ribs.

* * * * *